(12) United States Patent
Dietrich et al.

(10) Patent No.: US 7,911,666 B2
(45) Date of Patent: Mar. 22, 2011

(54) APPARATUS FOR READING A HOLOGRAM

(75) Inventors: Christoph Dietrich, Heidelberg (DE); Steffen Scheibenstock, Stuttgart (DE)

(73) Assignee: Tesa Scribos GmbH, Heidelberg (DE)

( * ) Notice: Subject to any disclaimer, the term of this patent is extended or adjusted under 35 U.S.C. 154(b) by 720 days.

(21) Appl. No.: 11/597,677

(22) PCT Filed: Dec. 15, 2005

(86) PCT No.: PCT/EP2005/013472
§ 371 (c)(1),
(2), (4) Date: Dec. 6, 2007

(87) PCT Pub. No.: WO2006/063824
PCT Pub. Date: Jun. 22, 2006

(65) Prior Publication Data
US 2008/0068687 A1 Mar. 20, 2008

(30) Foreign Application Priority Data
Dec. 15, 2004 (DE) .................. 20 2004 019 513 U

(51) Int. Cl.
*G03H 1/08* (2006.01)
*G03H 1/26* (2006.01)
*G02B 5/32* (2006.01)

(52) U.S. Cl. ................ 359/9; 359/15; 359/22

(58) Field of Classification Search .......... 359/9, 15
See application file for complete search history.

(56) References Cited

U.S. PATENT DOCUMENTS

| | | | |
|---|---|---|---|
| 4,072,395 A * | 2/1978 | Mohon | 359/19 |
| 4,208,086 A | 6/1980 | Perry | |
| 5,426,520 A | 6/1995 | Kakae et al. | 359/2 |
| 5,515,183 A * | 5/1996 | Hashimoto | 359/9 |
| 5,579,161 A * | 11/1996 | Sekiguchi | 359/559 |
| 5,623,347 A | 4/1997 | Pizzanelli | 359/2 |
| 5,798,864 A | 8/1998 | Sekiguchi et al. | |
| 6,052,540 A | 4/2000 | Koyama et al. | |
| 2009/0134224 A1 * | 5/2009 | Dietrich et al. | 235/457 |

FOREIGN PATENT DOCUMENTS

| | | |
|---|---|---|
| DE | 42 37 415 | 5/1993 |
| EP | 0 802 462 | 10/1997 |
| WO | 02/084588 | 10/2002 |

* cited by examiner

Primary Examiner — Arnel C Lavarias
Assistant Examiner — Jade R Chwasz
(74) Attorney, Agent, or Firm — Proskauer Rose LLP

(57) ABSTRACT

An apparatus for reading a hologram, in particular a computer-generated hologram, that includes a radiation source for irradiation of the hologram with a read beam composed of electromagnetic radiation, and an outlet opening for receiving an image that is produced from the hologram. The apparatus may allow both greater variability and greater convenience in use with a simple design. The apparatus further includes optics having at least two lenses in which a focal point of the first lens and a focal point of the second lens are each arranged essentially on one plane, and in which the hologram is arranged in front of the second lens as viewed along the beam direction.

17 Claims, 8 Drawing Sheets

APPARATUS FOR READING A HOLOGRAM

BACKGROUND OF THE INVENTION

The present invention relates to an apparatus for reading a hologram, in particular a computer-generated hologram, having a radiation source for irradiation of the hologram with a read beam composed of electromagnetic radiation, and having an outlet opening for recording an image which is produced from the hologram.

In general, a wide range of readers for holograms are known from the prior art. Many of these readers relate to conventionally illuminated holograms, although some also deal with computer-generated holograms (CGH).

Computer-generated holograms, in particular digital holograms, are two-dimensional dot matrices, preferably with very small dimensions, which comprise individual dots with different optical characteristics.

Images and/or data are/is reproduced by illumination of a computer-generated hologram with, for example, a coherent electromagnetic wave, in particular a light wave, by diffraction in transmission or reflection. The different optical characteristics of the individual dots may be reflection characteristics, for example by means of surface topography, varying optical path lengths in the material of the storage medium (refraction indices) or color values of the material.

In contrast to conventional holograms, the diffraction structures on the hologram plane are not illuminated conventionally but are calculated by computers using algorithms and are introduced point-by-point into the material of the storage medium. These are so-called computer-generated holograms (CGH), which can be used for classification, for identification and for individualization of any given objects. In this case, they are increasingly being used in safety-relevant areas.

The computer-generated holograms explained above may carry different information items. On the one hand, the hologram may carry holographic information which reproduces a directly legible information item (script, figure, graphics) during reading, i.e. on reproduction. The information that is read may likewise be scrambled, in particular digitized. By way of example, the reproduced hologram then contains a digital matrix similar to a one-dimensional or two-dimensional barcode.

In addition, the dot distribution of the computer-generated hologram may in its own right have directly legible information with very small dimensions, for example a microscript or a microimage. The directly legible information must be enlarged for identification, that is to say by a process which differs from the reading of the hologram. The microscript and/or the microimage may itself in turn be scrambled. For example, a microimage may itself represent digital information of a one-dimensional or two-dimensional barcode. It is thus possible to combine holographic and directly legible information in the holograms to be read.

Particularly in the case of Fourier transformation holograms, irrespective of whether these are conventionally illuminated or computer-generated holograms, the problem exists that a transformation lens is required for reconstruction of the stored information. In the traditional case, this is placed in the beam path, behind the hologram, at the same distance as its positive focal length from the hologram. The reconstructed image can then be observed clearly on the rear focal plane of the lens. Alternatively, the transformation lens can also be positioned in direct contact with the hologram plane, or even in front of the hologram. The reconstructed s image can once again be observed clearly on the rear focal plane of the transformation lens.

Alternatively, it is also possible to project the reconstruction onto a screen, which is positioned comparatively far away. This is associated with the fact that the far-field diffraction pattern corresponds to a Fourier transformation. However, this option is associated with less clarity, less brightness and often with excessively large dimensions of the image and, for these reasons, is not preferred. It is also known for a CCD detector (charge coupled device) to be used as an alternative to a screen for the reconstruction. Solutions such as these are, however, costly and complex. By way of example, reference is made to DE 42 37 415, EP 0 802 462 or U.S. Pat. No. 5,623,347 with regard to the prior art which discloses such known apparatuses.

WO 02/084588, on which the present invention is based, discloses the use of the human eye itself as a Fourier transformation lens, in order to simplify a reader for reading holograms. This makes it possible to considerably simplify apparatuses for reading holograms.

SUMMARY OF THE INVENTION

Although the known apparatus has fundamentally been proven, it is necessary in order to avoid a restriction to the field of view for the eye to be moved very close to the hologram to be read. In the case of a hologram grid spacing of 1.6 µm by way of example and a reading wavelength of, for example, 658 nm, the diffraction angle of the read beam is thus 12°. If the pupil diameter is assumed to be about 5 mm, the eye would thus have to be positioned at a distance of about 2 cm from the hologram in order not to restrict the field of view. This can be uncomfortable, particularly in the case of holograms on relatively large objects. The reconstruction of particularly small holograms is also often uncomfortable.

In other words, the angle range within which the reconstruction can be viewed cannot be influenced. A viewer cannot thus move his or her eyes freely in order to allow the reconstruction to be viewed in different viewing directions. The field of view is thus restricted.

Furthermore, it is sometimes desirable for the reader to be matched to the individual visual acuity of the user of the apparatus, in a similar way to that with a telescope or a microscope.

Against the background of the explained prior art, the invention is based on the technical problem of providing an apparatus for reading a hologram of the type mentioned initially, which allows greater variability and greater convenience in use, with a simple design at the same time.

This technical problem is solved according to the invention by an apparatus for reading a hologram, in particular a computer-generated hologram, having a radiation source for irradiation of the hologram with a read beam composed of electromagnetic radiation, and having an outlet opening for recording an image which is produced from the hologram, in that optics which have at least two lenses are provided, in which a focal point of the first lens and a focal point of the second lens are each arranged essentially on one plane, and in which the hologram is arranged at least in front of the second lens, viewed in the beam direction.

The described optics thus allow a parallel beam which is incident on one side of the optics to be converted to an essentially parallel beam emerging on the other side of the optics. In this case, an "essential" match is referred to because the visual clarity can be adjusted by a minor position variation. The beam geometry may thus differ somewhat from the ideal parallelity. This will be explained in more detail further below.

The aim of the described design is to match the angle range of the field of view for observation with the human eye. In this case, it is also possible to refer to angle transformation. The optics thus allow the eye to be a relatively long distance away from the hologram in comparison to direct viewing of the reconstruction of the hologram. In order to avoid a restriction to the field of view, it is therefore no longer necessary to move the eye physically very close to the hologram to be read. The convenience and the variability are thus increased by the apparatus in comparison to a known reading apparatus, with the design being simple at the same time.

DETAILED DESCRIPTION OF THE INVENTION

The apparatus for reading a hologram, in particular a computer-generated hologram, has a radiation source for irradiation of the hologram with a read beam composed of electromagnetic radiation. The read beam is used for reconstruction of the hologram by diffraction. In this case, the read beam can irradiate the hologram both in reflection and in transmission.

Furthermore, an outlet opening is provided for recording an image which is produced from the hologram. The human eye perceives the image produced from the hologram on the outlet opening.

There are various variants of the configuration of the optics which are essentially equivalent to one another. For example, both lenses may be convex. It is likewise possible for one of the lenses to be convex and for the other of the lenses to be concave. The focal lengths of the two lenses may be of equal magnitude or may be of different magnitude when both lenses are convex. If one of the lenses is concave, then the two focal lengths differ from one another.

The hologram may likewise be arranged differently with respect to the optics. On the one hand, the hologram can be arranged in front of the optics, seen in the beam direction. On the other hand, the hologram can be arranged between the two lenses. In the first case, the hologram can be viewed in reflection or transmission, but in the second case only in transmission.

In one particularly preferred design of the optics, to which the present invention is not restricted, at least one first lens, which is arranged between the hologram and the outlet opening, and at least one second lens, which is located between the first lens and the outlet opening, are provided for this purpose. The two lenses are arranged at a distance which corresponds essentially to the sum of the focal lengths of the two lenses. In addition to carrying out the reconstruction, the two lenses allow the imaging of the dot distribution of the hologram for viewing of the dot distribution per se. For this purpose, the image plane is shifted by means of the optics to the location of the pupil or even—seen in the beam direction—behind the pupil, thus improving the viewing comfort for a user, even when viewing the hologram itself.

The design of the optics has been described above on the basis of two lenses. It should thus be stressed here that it is also possible to arrange a plurality of lenses as the lens system, instead of each lens. The invention is thus not restricted to the arrangement of two individual lenses.

It is particularly simple for the lenses to have identical focal lengths. However, the size of the reconstruction can be adjusted by individual matching of the focal lengths.

If the hologram is arranged in front of the two lenses, seen in the beam direction, then, furthermore, the focal length ratio of the two lenses can be defined to determine whether the reconstruction is reduced or enlarged in size. Conversely, this also applies to the imaging of the dot distribution of the hologram. It is also possible to provide zoom optics instead of one of the two lenses, in order to allow the magnification of the reconstruction of the hologram to be adjusted.

If the hologram is arranged between the two lenses, the degree of magnification is governed by the distance between the hologram and the common focal point and by the focal length of the second lens.

In a further preferred embodiment of the present invention, the first lens and/or the second lens are/is arranged such that it or they can be moved axially along the beam path. It is thus advantageously possible to match the clarity of the reconstruction in the eye of the viewer, which is particularly advantageous for users with different visual acuities. It is thus possible for wearers of a vision aid to use the apparatus with or without the vision aid. This further increases the convenience of the apparatus.

According to one preferred refinement, a device can be provided for movement of one of the lenses out of the beam path and into the beam path. The lens can be moved in a particularly simple manner by pivoting. An appropriate pivoting device for the lens can be provided for this purpose. In particular, the device can move the second lens out of the beam path and into the beam path.

In the case of a lens which has been removed from the beam path, the remaining convex lens acts as a simple magnifying glass. In this way, the surface of the hologram can be seen magnified by the user of the apparatus. The apparatus can thus be positioned for reading in a particularly simple manner sufficiently precisely that the read beam irradiates the hologram to be reconstructed, and the apparatus is located at a position which is suitable for reading of the hologram. This refinement is particularly advantageous for small holograms or if no other types of positioning aids are provided, for example stop edges. This is the case in particular when the apparatus is intended to be used to read frequently changing holograms.

When a lens has been removed from the beam path, it is also possible to read directly legible information, for example a microscript or a microimage.

When the lens is moved into the beam path, the hologram can then be reconstructed.

An illumination device can be provided for illumination of the hologram. The illumination device is intended in particular for positioning of the apparatus with respect to the hologram or else for reading a directly legible information item. An illumination device such as this simplifies the positioning of the apparatus or the reading of directly legible information.

The illumination device may in this case have at least one light-emitting diode. Light-emitting diodes can be produced at particularly low cost and are distinguished by long life and little maintenance effort with a good illumination power.

According to a further refinement, the device for movement of one of the lenses and the illumination device can be coupled to one another. A coupling such as this makes it possible for the respective other coupled device to likewise be operated automatically in a simple manner when the device for movement of the lens or the illumination device is operated. This makes it possible in a particularly simple manner, for example, for the illumination device to be activated automatically when the lens has been removed from the beam path, or for the illumination device to be deactivated automatically when the lens has been moved into the beam path. The device for movement of the lens may, of course, also be operated automatically by operation of the illumination device. This increases the convenience of the apparatus.

It is likewise possible for the device for movement of one of the lenses and the radiation source to be coupled to one another. Analogously to the described coupling of the device for movement of the lens to the illumination device, this means that the read beam can be activated in a particularly manner when the lens has been moved into the beam path, and the read beam can be deactivated in a particularly simple manner when the lens has been removed from the beam path. Once again, of course, it is also feasible for the device for movement of the lens to be operated automatically by operation of the radiation source. This further increases the convenience.

By way of example, separate switches or a common switch can be provided on the apparatus in order to activate the respectively coupled functions.

As a read beam which can be produced particularly advantageously and at the same time has high coherence, a laser beam can be provided as the read beam. Diode lasers are particularly suitable for this purpose. These are distinguished by a compact design and low excitation currents. Furthermore, diode lasers are available at low cost. Alternatively, other laser types can also be used. Helium-neon lasers are also mentioned here, just by way of example.

According to one further preferred teaching, a shadowing device, in particular a shutter, is provided for shadowing of the read beam which is reflected or transmitted directly by the hologram. The zeroth order of the diffraction image created during the reconstruction process is thus shadowed. This prevents the user of the apparatus from being dazzled by components of the read beam reflected or transmitted directly by the hologram. The contrast within the reconstruction is thus improved.

For further improved reading of the hologram, the outlet opening may have a shadowing device, in particular a hood matched to the human eye, for shadowing of interference light. This prevents environmental light which is incident in particular from the side from being perceived by the eye. This results in a higher-contrast, clearer, sharper and brighter reconstruction of the hologram on the retina of the eye.

According to one particularly practical refinement, the apparatus may be of modular design. A refinement such as this makes it possible, in particular, to replace individual parts of the apparatus in a simple manner. This relates to all those parts which are subject to wear, for example parts of the illumination or else the lenses that are used. Furthermore, replacement of the lenses allows the optical characteristics of the apparatus to be matched even more variably to the holograms to be read, by the choice of lenses of suitable focal length.

According to a further teaching, at least one positioning device can be provided for positioning of the apparatus with respect to the hologram. Suitable positioning devices may be, for example, guide rails, brackets, magnets, edges or other suitable devices. Positioning devices such as these allow rapid, simple and precise positioning of the apparatus for reading of the hologram.

According to a further refinement, a device can be provided for adjustment of the size of the area of the hologram which is irradiated by the read beam. This means that it is possible to adjust the read beam in such a manner that the hologram is, for example, read completely, or else any part of it is read, in the respectively desired manner.

Furthermore, a device can be provided for positioning of that area of the hologram which is irradiated by the read beam. It is thus possible to position the read beam in such a manner that only a respectively desired area of the hologram is read. This is particularly advantageous for partial illumination of multiple holograms.

It is also feasible to provide a device for adjustment of the beam power of the read beam. The read beam can thus be optimally matched to the characteristics of the respective hologram to be read.

According to one particularly practical refinement, the hologram can be stored in a storage medium. In principle, all known storage media may be used as the storage medium.

The apparatus may have a device which automatically switches off the apparatus, particularly the read beam and the illumination device, when the apparatus has not be used for a defined time period. A so-called time-out function such as this makes it possible to protect a battery that may be provided, as well as the components that are used.

The invention will be explained in the following text with reference to a drawing which illustrates one exemplary embodiment, and in which:

FIG. 1 shows a first perspective view of an apparatus according to the invention, FIG. 2 shows a second perspective view of the apparatus illustrated in FIG. 1, FIG. 3 shows the optical system of the apparatus illustrated in FIG. 1, in a first operating position, FIG. 4 shows the optical system of the apparatus illustrated in FIG. 1, in a second operating position, FIG. 5 shows the optics of the human eye with its function as a Fourier transformation lens, and FIGS. 6 to 12 show various configurations of the optics.

FIGS. 1 and 2 show an apparatus V for reading a hologram. The apparatus V has an essentially tubular holder 1, in which the optical system of the apparatus V is contained. At one end 1a of the holder 1, the apparatus V can be placed on a hologram to be read or on a storage medium which contains the hologram. At the opposite end, the holder 1 has an outlet opening 2 for receiving an image, which is produced from the hologram, as well as a hood 3 for shadowing of interference light. In order to read the hologram, the use can place his eye 14, which acts as a transformation lens, on the hood 3.

A holding section 4 for holding the apparatus V is attached to the holder 1 at the side, along its longitudinal axis. In order to make it possible to hold the holding section 4 better with one hand, it has, for example, a surface structure 5 which is in the form of a type of perforation.

In the illustrated exemplary embodiment, a laser, for example a diode laser, is on the one hand arranged in the holding section 4, for irradiation of the hologram. On the other hand, a light-emitting diode is provided for illumination of the hologram, for positioning of the apparatus V with respect to the hologram and for reading of directly legible information. Furthermore, the electronics, the pivoting mechanism which will be explained further below, and one or more batteries for supplying the illumination device and the laser which is used for reconstruction of the hologram, can be provided in the holding section 4.

A push-button switch 6 for switching the apparatus V on and off is provided on one side of the holding section 4. A toggle switch 7 and a rotating wheel 8 are provided on the opposite side of the holding section 4. The toggle switch 7 is used to change the operating position of the apparatus V from a setting for positioning of the apparatus V with respect to the hologram to be read and for reading directly legible information, to a setting for reconstruction of the hologram. In the first setting, the lens 12 which remains in the beam path represents a magnifying glass. The rotating wheel 8 is used to adjust the clarity of vision of the reconstruction of the hologram which is created on the retina of the human eye 14. The function of the toggle switch 7 and of the rotating wheel 8 will be explained with reference to FIGS. 3 and 4.

The switch 6 for switching the apparatus V on and off as well as the toggle switch 7 and the rotating wheel 8 can be operated by one finger, with a small amount of force and movement being applied, when the apparatus V is held. The apparatus V is of modular design, so that individual components can be replaced quickly and without any problems.

FIG. 3 shows the operating position for positioning of the apparatus V with respect to a hologram 9 that is to be read, and for reading directly legible information. The hologram 9 is a computer-generated hologram (CGH) which, for example, can be stored in a storage medium.

Figure 1:
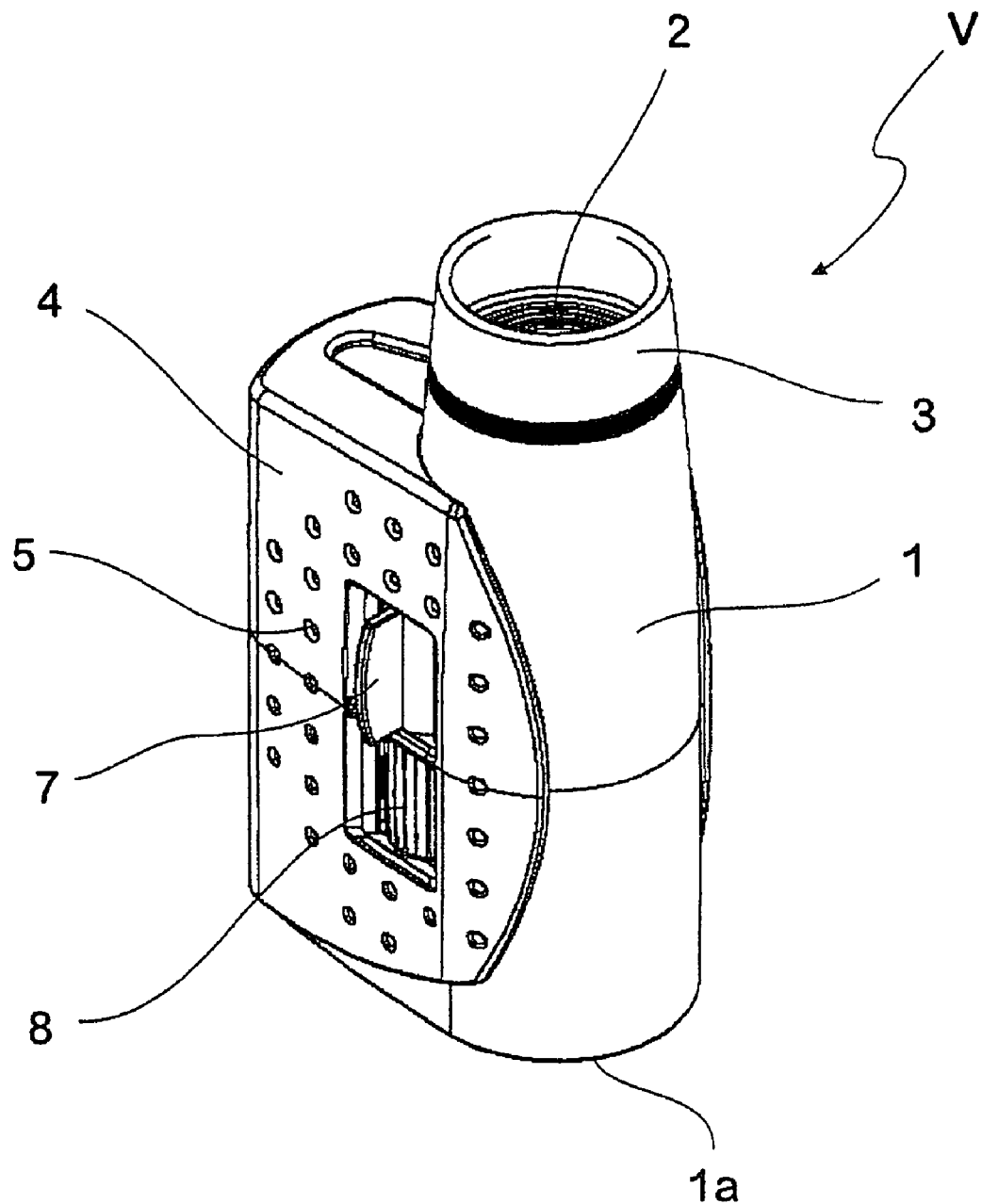
Figure 2:
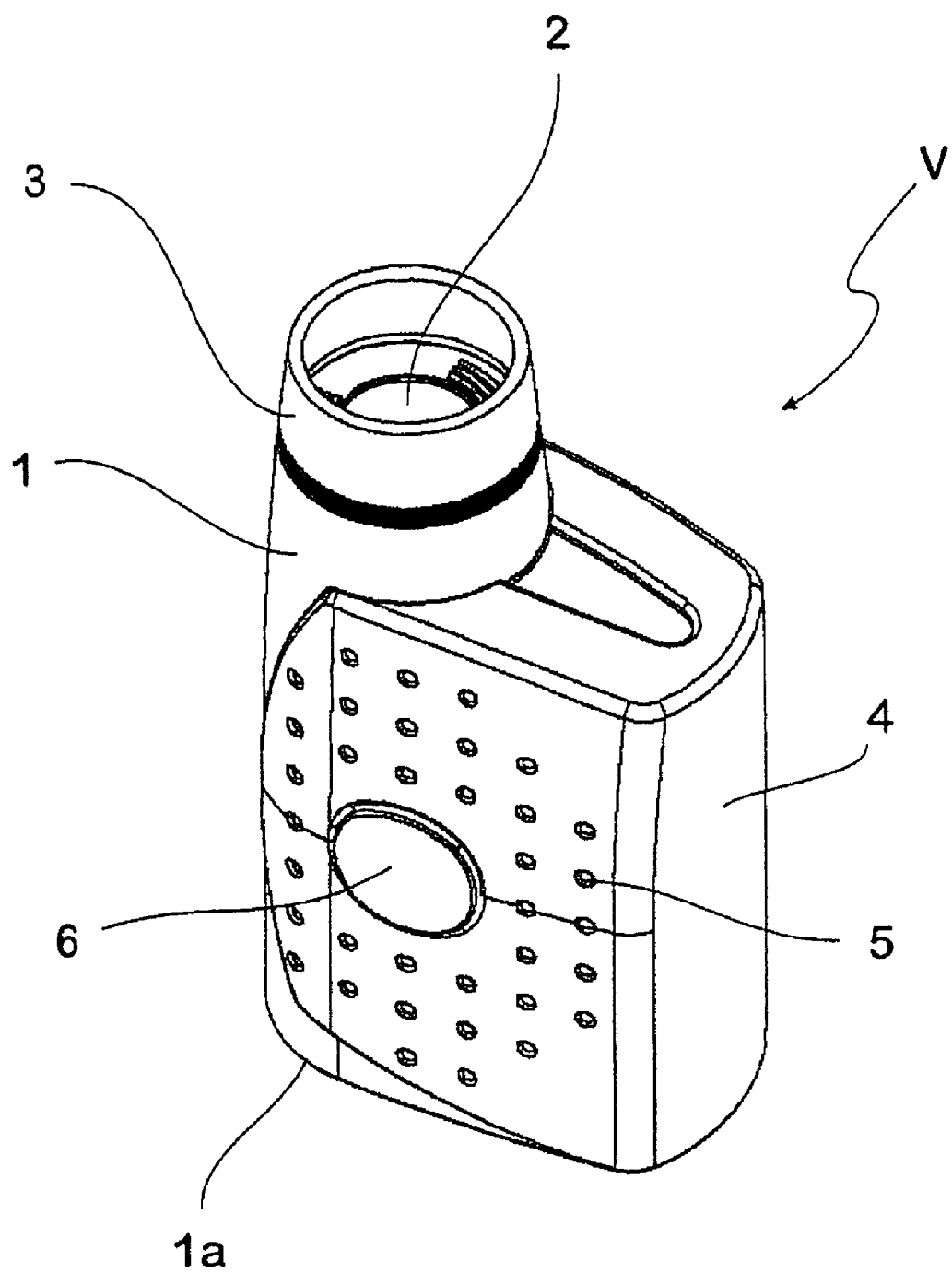

The illustrated light-emitting diode 15 illuminates the area of the hologram 9 with visible light. The light which is reflected from the hologram 9 passes through a biconvex lens 12 which is arranged in the beam path. The lens 12 can be moved axially along the beam path of the optical system, as is indicated schematically by the double-headed arrow 12a. The lens 12 produces a virtual image of the irradiated hologram 9, corresponding to its focal length, and this image can be viewed through the outlet opening 2 and through the hood 3 on the apparatus V by the human eye 14. The variation of the position of the lens 12 results in different magnifications of the hologram itself.

Figure 3:
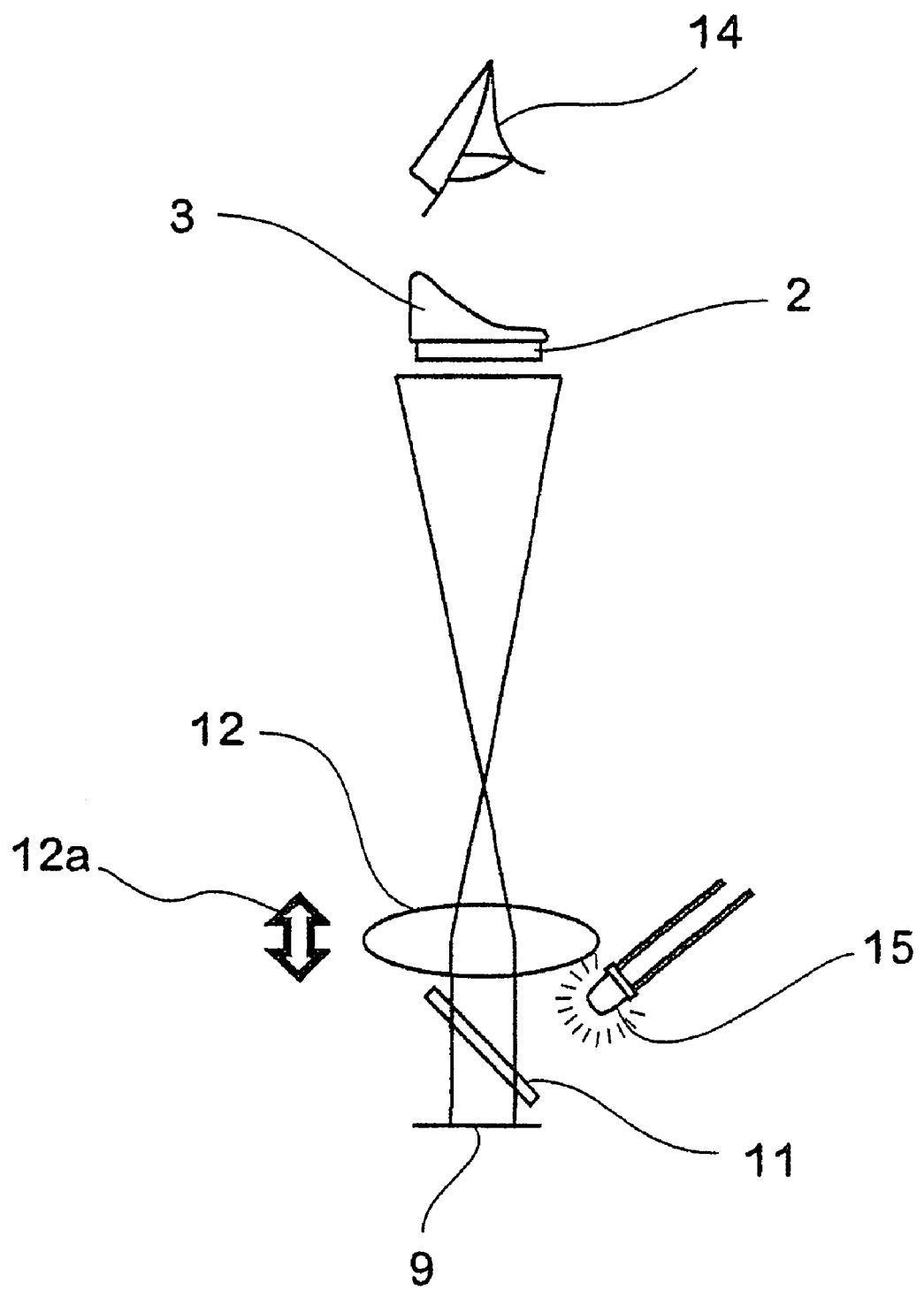
FIGS. 3 and 4 show the optical system of the apparatus V schematically, in a first and in a second operating position.

The lens 12 illustrated in FIG. 3 is thus used as a simple magnifying glass in the optical system. The viewer's eye 14 sees an image, magnified as desired, of the hologram 9 to be read, that is to say the actual dot distribution in the case of a computer-generated hologram, and the viewer can thus position the apparatus V optimally with respect to the hologram 9 to be read, and/or can read directly legible information. Because of the modular design of the apparatus V, the lens 12 can be replaced in a simple manner by a lens with a suitable different focal length, in order to achieve even greater variability of the magnification.

Figure 4:
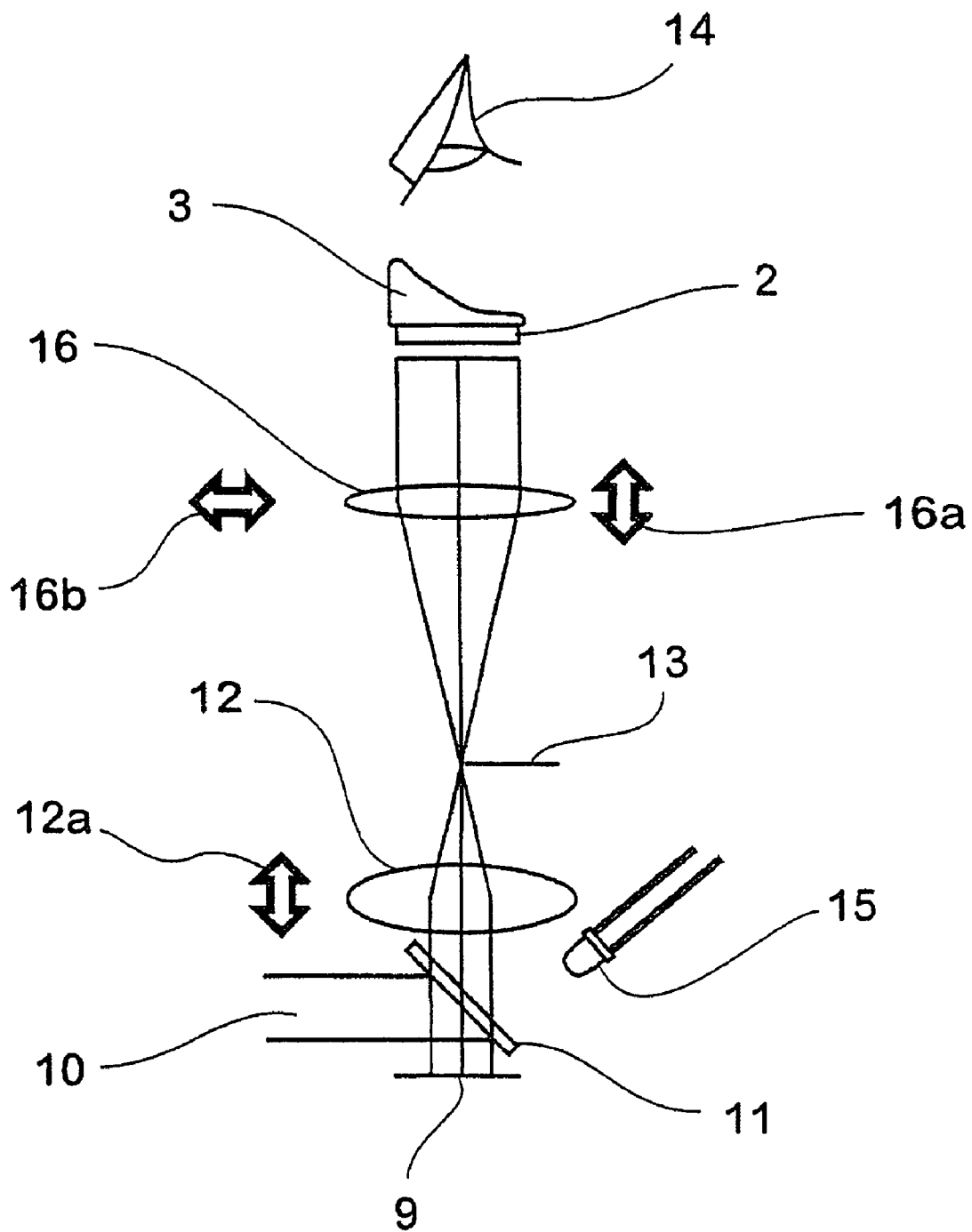

Once the apparatus V has been positioned and/or directly legible information has been read, the user can change to the operating position illustrated in FIG. 4. To do this, he operates the toggle switch 7. The toggle switch 7 operates a device which is not illustrated, in this case a pivoting device, which moves a second lens 16 into the beam path. The lens 16 had previously been pivoted out of the beam path into a free space provided for this purpose in the holding section 4. This lens 16 is likewise biconvex and can likewise be moved axially along the beam path, as illustrated schematically by the double-headed arrow 16a. Devices which are known per se that are not illustrated are provided for movement of the lenses 12, 16. The capability to move the lens 16 out of the beam path and into the beam path is illustrated schematically by the double-headed arrow 16b.

The light-emitting diode 15 is automatically deactivated, and the read beam 10 activated, as a result of the pivoting device being coupled to the light-emitting diode 15 and to the radiation source when the lens 16 is pivoted in, operated by the toggle switch 7. The read beam 10 is deactivated and the light-emitting diode 15 activated in a corresponding manner when the lens 16 is pivoted out of the beam path.

When the second lens 16 is pivoted into the beam path, the reconstruction of the hologram 9 is imaged by the lens 16 and the human eye 14 on the retina of the eye 14. In this case, the second lens 16 images the intermediate reconstruction 13 at infinity in the position illustrated in FIG. 4, and the eye 14 acts as a Fourier transformation lens. The lenses 12 and 16 can be moved axially along the beam path relative to one another and relative to the plane of the intermediate image 13 by operation of the rotating wheel 8, so that the user can adjust the clarity of the reconstruction of the hologram 9 on the retina of the eye 14. Furthermore, the optical characteristics of the apparatus V can once again be varied further by replacement of the lenses 12, 16 by lenses with a suitable different focal length.

A shutter (which is not illustrated in any more detail) is provided in order to mask out the laser light which is reflected directly from the hologram 9, that is to say the zero diffraction order. This means that the user of the apparatus V is not dazzled during the reconstruction of the hologram 9, and the reconstruction contrast is improved.

The apparatus V also has a time-out function, which automatically switches off the apparatus V when it has not been used for a predetermined time period, in order to conserve the battery and other parts which are subject to wear.

If the read beam 10 is appropriately guided, it is, of course, likewise possible to read the hologram 9 in transmission.

It is likewise possible to provide devices which are known per se, which allow both the size and the position of the hologram area which is irradiated by the read beam 10 to be varied.

Figure 5:
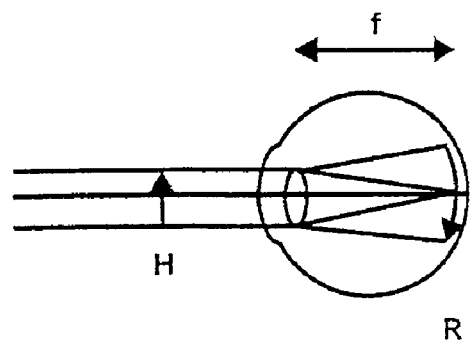

Different optical systems will be described in the following text with reference to FIGS. 6 to 11. First of all, however, FIG. 5 shows how the human eye acts as a Fourier transformation lens to image the reconstruction of the hologram H on the retina, as R. This function is always presupposed in the following examples, and is based on the fact that the reconstruction of the hologram is imaged at infinity, that is to say in the form of an essentially parallel beam. The size of the reconstruction R on the retina of the observer is used as a reference in the following text, in order to identify an increase or a reduction in size which results from the various optics.

Figure 6:
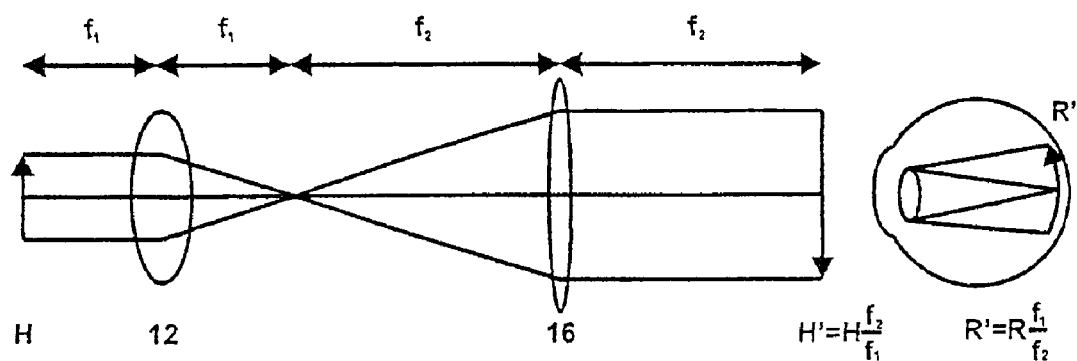

FIG. 6 shows the configuration corresponding to FIG. 4. The focal lengths $f_1$ of the lens 12 and $f_2$ of the lens 16 are shown as double-headed arrows. The lenses 12 and 6 are arranged at a distance $f_1+f_2$ from one another. In other words, one focal point of the first lens 12 and one focal point of the second lens 16 are arranged on a common plane, the focal plane of the two lenses. Furthermore, the hologram H is located at a distance $f_1$ from the first lens 12. The hologram H, that is to say the dot distribution per se, is imaged at a distance $f_2$ to the right of the lens 16, as H'. The size of H' depends on the ratio of the focal lengths $f_2/f_1$, and on the size H as is illustrated in FIG. 6.

The size of the reconstruction R' on the retina of the eye likewise depends on the focal lengths, but conversely on the ratio $f_1/f_2$ and on the size R, as is likewise evident from the formula illustrated in FIG. 6.

Figure 7:
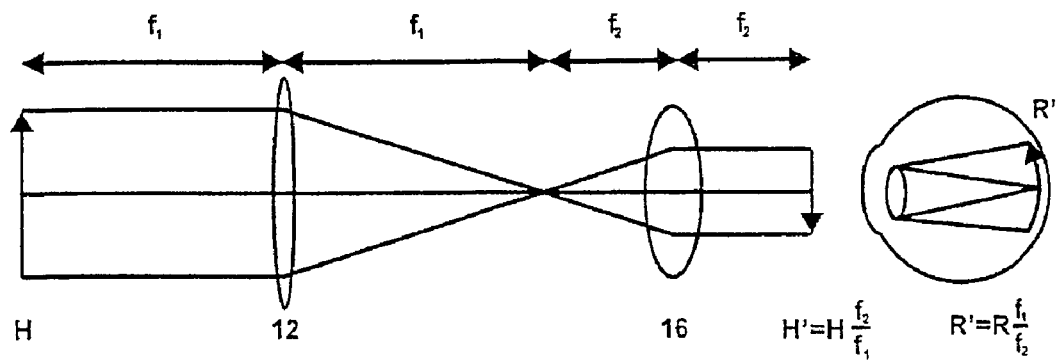

FIG. 7 shows the same configuration as FIG. 6, but in this case the two focal lengths $f_2$ and $f_1$ of the lenses 12 and 16 have been reversed. The size H' thus differs from the size H' illustrated in FIG. 6, as is evident from the formula in FIG. 7.

In FIGS. 6 and 7, the hologram is arranged outside the optics of the two lenses 12 and 16.

Figure 8:
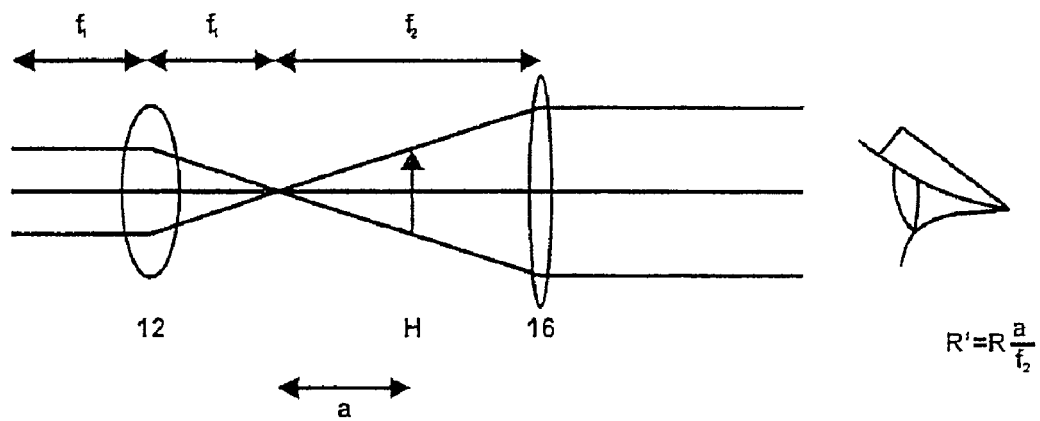

FIG. 8 shows an arrangement in which the hologram H is arranged between the lens 16 itself and the focal plane which is arranged at the distance $f_2$ from the lens 16. In this case, the hologram is at a distance a from the focal plane of the lens 16. In this arrangement, the hologram H is not imaged in the form of an image H', but this results in a very compact optics system, since the hologram H is arranged between the lenses 12 and 16, and not outside them. However, the improvement in the field of view for observation by a human eye is achieved in the same way as in the other examples. This is because the size of the reconstruction R' is reduced corresponding to the ratio of the distance a to the focal length $f_2$ of the second lens 16, and corresponding to the size R. This is governed by the formula in FIG. 8.

Figure 9:
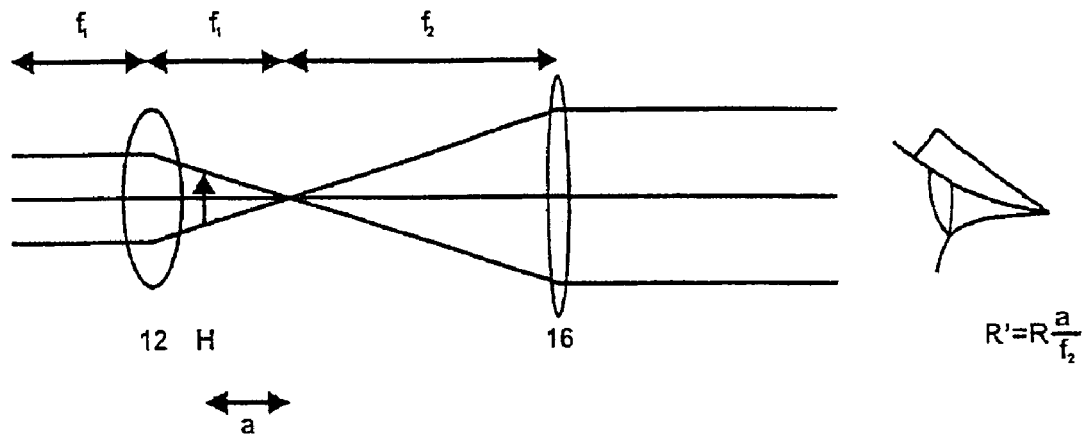

FIG. 9 shows a very similar situation, in which the hologram is arranged at a distance a from the focal plane (which is arranged at a distance $f_1$ from the first lens 12) and the lens 12 itself. This results in the same effect as that in the example shown in FIG. 8. This is because the size of the reconstruction R' is also reduced in this case corresponding to the ratio of the distance a to the focal length $f_2$ of the second lens 16. The formula relating to this is shown in FIG. 9. The magnifying-glass function by pivoting out the lens 12 is in this case possible only to a restricted extent, since the lens 16 first has to be moved towards the hologram H before magnification can be produced.

The optics shown in FIGS. 6 to 9 each have two convex lenses.

Figure 10:
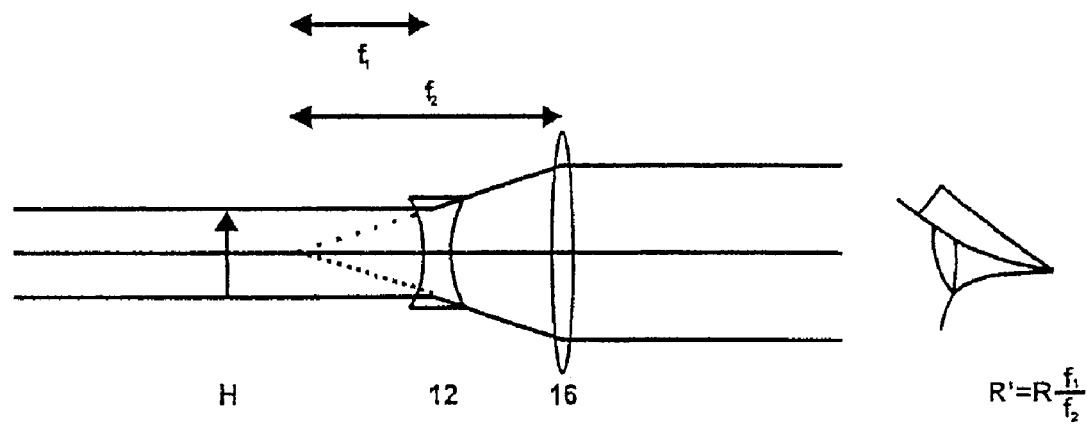

FIG. 10 shows a configuration in which the first lens 12 has a concave refraction characteristic. The second lens 16 is also a convex lens here. The two lenses 12 and 16 are arranged on the same side, in the direction of the beam path in front of the lenses 12 and 16, on the common focal plane at a distance $f_1$ from the first lens 12 and at a distance $f_2$ from the second lens 16. The reconstruction R' in this case results from the ratio of the focal lens $f_1$ and $f_2$, with $f_1$ being less than $f_2$, so that R' is thus smaller than R. In this context, see the formula illustrated in FIG. 10. In this arrangement as well, a magnifying-glass function is provided only when the first lens 12 is pivoted out of the beam path, and the position of the second lens 16 is moved towards the hologram.

Figure 11:
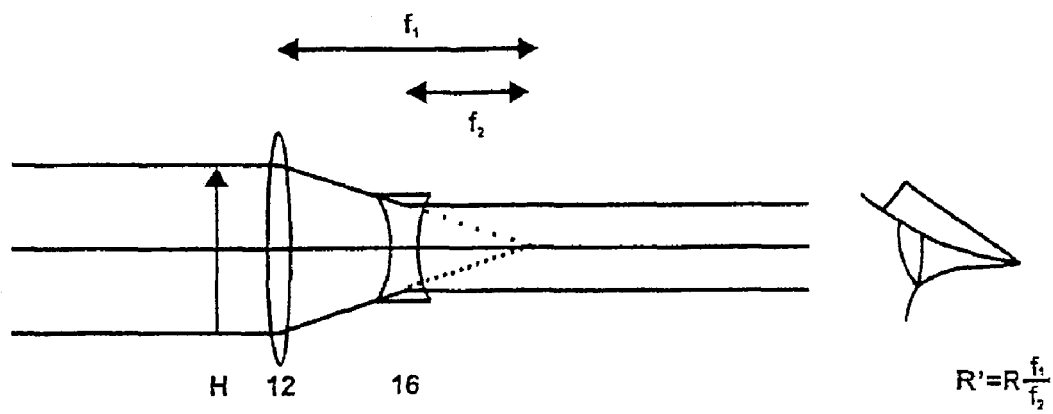

The configuration shown in FIG. 11 has a convex first lens 12 and a concave second lens 16, which are arranged such that their focal planes coincide behind the lenses 12 and 16 in the radiation direction. Because of the ratio of $f_1$ to $f_2$, this results in magnification of the reconstruction in comparison to R. The magnifying-glass function by the lens 12 is also provided only to a limited extent in this case, since there is only a short distance between the hologram and the lens 12, and thus only a small amount of magnification.

In FIGS. 10 and 11, the hologram is arranged outside the optics of the two lenses 12 and 16.

Figure 12:
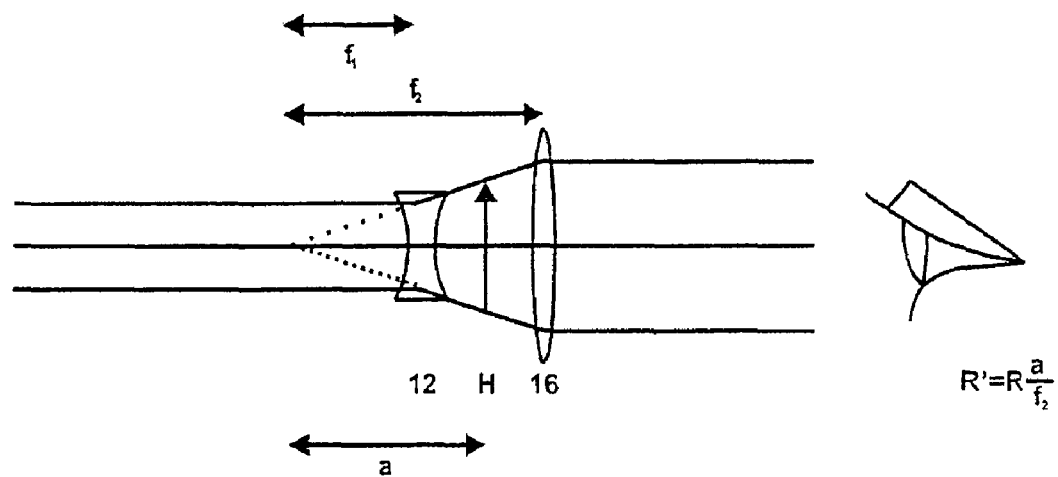

FIG. 12 shows a configuration in which the hologram H is arranged between the two lenses 12 and 16, with the first lens 12 being concave and the second lens 16 being convex, and with the lenses being arranged with respect to one another in the manner illustrated in FIG. 10. This once again results in the reconstruction R being reduced in size in the ratio of the distance a to the focal length $f_2$.

The invention claimed is:

1. An apparatus for reading a computer-generated hologram contained in a storage medium, the apparatus comprising:
   a radiation source for irradiation of the hologram contained in the storage medium with a read beam composed of electromagnetic radiation;
   an outlet opening for receiving an image that is produced from the hologram;
   optics including at least a first lens and a second lens; and
   a holding section for holding the apparatus with one hand;
   wherein the apparatus is configured to be placed on the storage medium that contains the hologram;
   wherein a focal point of the first lens and a focal point of the second lens are each arranged essentially on one plane;
   wherein the optics are configured such that the first lens is positioned between the hologram and the outlet opening and such that the second lens is positioned between the first lens and the outlet opening; and
   wherein the optics are configured to produce a reconstruction of the hologram on a retina of a human eye.

2. The apparatus as claimed in claim 1, wherein the first lens and the second lens are convex.

3. The apparatus as claimed in claim 1, wherein one of the first lens and the second lens is convex, and the other of the first lens and the second lens is concave.

4. The apparatus as claimed in claim 1, wherein the focal length of the first lens is different than the focal length of the second lens.

5. The apparatus as claimed in claim 1, wherein one or both of the first lens and the second lens are configured to be moved axially along the beam path.

6. The apparatus as claimed in claim 1, further comprising a device for movement configured to move one of the first lens or the second lens out of a beam path and into the beam path.

7. The apparatus as claimed in claim 6, wherein an illumination device is provided for illumination of the hologram.

8. The apparatus as claimed in claim 7, wherein the device for movement and the illumination device are coupled to one another.

9. The apparatus as claimed in claim 6, wherein the device for movement and the radiation source are coupled to one another.

10. The apparatus as claimed in claim 6, wherein the movement device is configured to pivot either the first lens or the second lens out of the beam path and into the beam path.

11. The apparatus as claimed in claim 1, wherein the read beam is a laser beam.

12. The apparatus as claimed in claim 1, further comprising a shutter for shadowing of the read beam that is reflected or transmitted by the hologram.

13. The apparatus as claimed in claim 1, wherein the outlet opening includes a hood matched to a human eye for shadowing of interference light.

14. The apparatus as claimed in claim 1, further comprising at least one positioning device for positioning of the apparatus with respect to the hologram.

15. The apparatus as claimed in claim 1, further comprising a device for adjustment of a size of an area of the hologram that is irradiated by the read beam.

16. The apparatus as claimed in claim 1, further comprising a device for positioning of an area of the hologram that is irradiated by the read beam.

17. The apparatus as claimed in claim 1, further comprising a device for adjustment of a beam power of the read beam.

* * * * *